(12) United States Patent
Rubin et al.

(10) Patent No.: US 10,650,003 B1
(45) Date of Patent: May 12, 2020

(54) EXPIRATION OF ELEMENTS ASSOCIATED WITH A PROBABILISTIC DATA STRUCTURE

(71) Applicant: Amazon Technologies, Inc., Seattle, WA (US)

(72) Inventors: Gregory Alan Rubin, Seattle, WA (US); Petr Praus, Seattle, WA (US); Benjamin Tillman Farley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 947 days.

(21) Appl. No.: 15/087,906

(22) Filed: Mar. 31, 2016

(51) Int. Cl.
*G06F 16/00* (2019.01)
*G06F 16/2457* (2019.01)
*G06F 16/28* (2019.01)
*G06F 16/23* (2019.01)

(52) U.S. Cl.
CPC .... *G06F 16/24573* (2019.01); *G06F 16/2365* (2019.01); *G06F 16/28* (2019.01)

(58) Field of Classification Search
CPC .................................................. G06F 16/24573
USPC .................................. 707/609; 709/223, 224
See application file for complete search history.

(56) References Cited

U.S. PATENT DOCUMENTS

| 8,135,863 | B2 * | 3/2012 | Nekovee | H04L 47/10 370/395.4 |
| 8,812,651 | B1 * | 8/2014 | Eriksen | H04L 45/745 709/224 |
| 2008/0256094 | A1 * | 10/2008 | Gupta | G06F 16/9014 |
| 2014/0052750 | A1 * | 2/2014 | Ciabrini | G06F 16/24552 707/769 |

* cited by examiner

*Primary Examiner* — Chelcie L Daye
(74) *Attorney, Agent, or Firm* — Davis Wright Tremaine LLP

(57) ABSTRACT

A computing resource service receives a request. In response to the request, the computing resource service queries a probabilistic data structure for an entry corresponding to the request. The computing resource service obtains, from the probabilistic data structure, a value that corresponds to the entry. Based at least in part on this value, the computing resource service determines whether the entry has expired. If the entry is expired, the request is fulfilled. However, if the entry has not expired, the request is denied.

20 Claims, 10 Drawing Sheets

US 10,650,003 B1

EXPIRATION OF ELEMENTS ASSOCIATED WITH A PROBABILISTIC DATA STRUCTURE

BACKGROUND

Bloom filters and other probabilistic data structures are often utilized to quickly and compactly determine whether an element is part of a set of elements or not. For instance, an administrator of a database can add database entries into a Bloom filter, which may then be used to support database queries by identifying whether a database entry is possibly within the database or is definitely not within the database. Bloom filters have the inherent advantage of being memory efficient, as entries added to Bloom filters are hashed in a manner that the resulting value merely triggers bits within the Bloom filter from zero to one. However, once an entry has been added to a conventional Bloom filter, the entry cannot be removed, as changing Bloom filter bits from one to zero may impact other entries within the Bloom filter, thereby potentially affecting the integrity of the Bloom filter. This is particularly problematic for data that automatically expires after some period of time and is no longer present.

BRIEF DESCRIPTION OF THE DRAWINGS

Various embodiments in accordance with the present disclosure will be described with reference to the drawings, in which.

DETAILED DESCRIPTION

Figure 1:
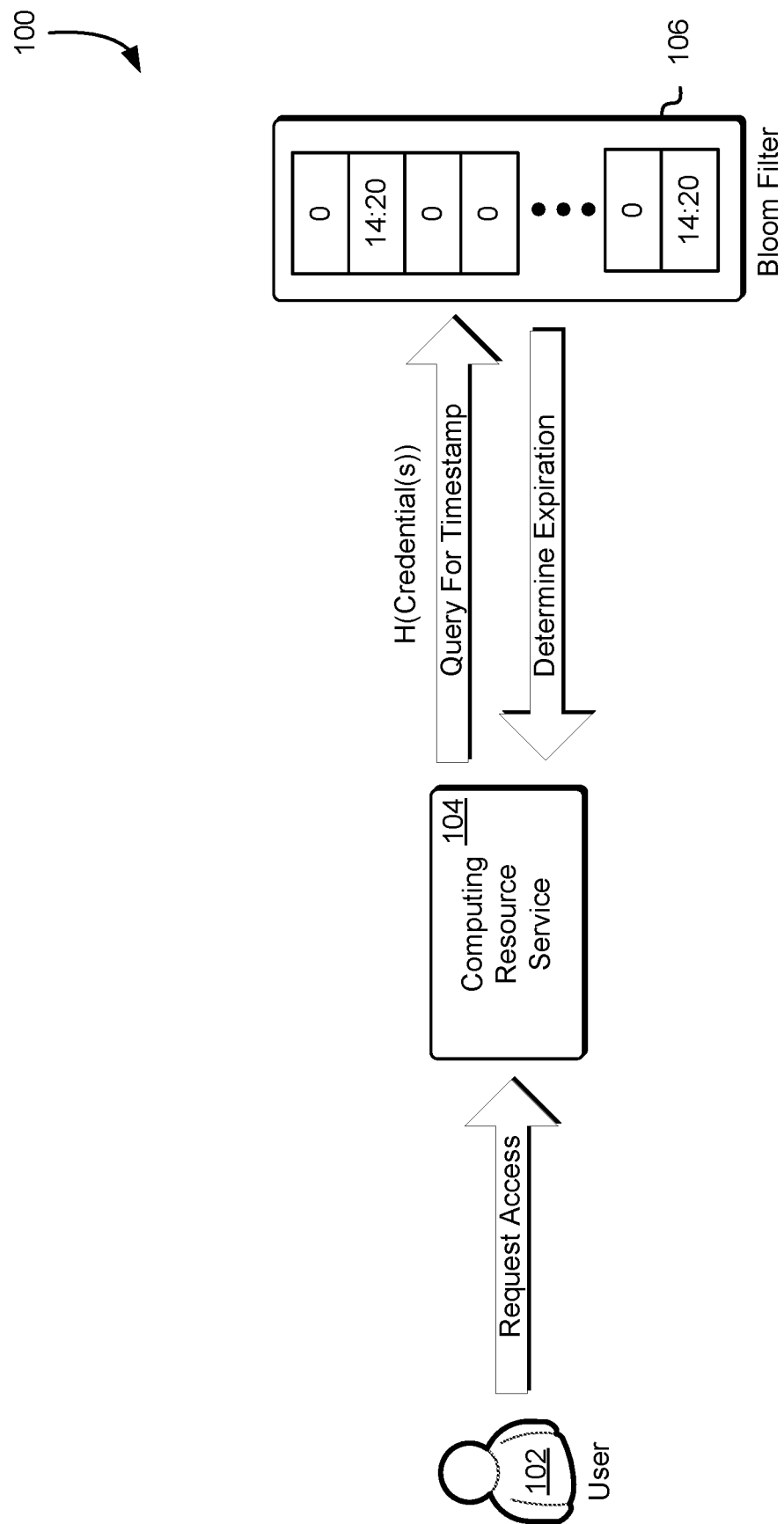
FIG. 1 shows an illustrative example of an environment in which various embodiments can be implemented.

This disclosure relates to the modification of a Bloom filter such that elements within the Bloom filter expire after a specified period of time such that the elements are implicitly removed from the Bloom filter. A computing resource service implements a Bloom filter or other probabilistic data structure that comprises an array of elements that are used to indicate a timestamp usable to determine if the timestamp is more recent than an expiring time. For instance, an entry is hashed to determine which elements of the Bloom filter are to be updated to specify a timestamp associated with the entry. A query for the entry may be performed in a similar manner, whereby the entry is hashed to identify the elements of the Bloom filter that correspond to presence of the entry. The computing resource service may evaluate these elements of the Bloom filter to obtain the timestamp corresponding to the entry and determine whether this timestamp is more recent than the expiring time for the entry.

In one example, a user of a computing resource service submits a request to access the computing resource service to perform an action. In the request, the user may provide its set of credentials to the computing resource service, which the computing resource service can use to authenticate the user and determine whether the user is authorized to perform the action. If the user is successfully authenticated and is authorized to perform the action, the computing resource service may use the user's set of credentials as inputs to an entry function. The output of this function may be hashed and this hash result may be used to determine which elements of the Bloom filter are to be evaluated. If the elements of the Bloom filter corresponding to the output of the function are set to zero (e.g., output is not present in the Bloom filter), the computing resource service may update these elements to specify a timestamp corresponding to a time at which the user's request was received. However, if the elements of the Bloom filter corresponding to the output of the function are set to a particular timestamp (e.g., the user has submitted a previous request), the computing resource service may evaluate the particular timestamp to determine whether the timestamp is within an expiration time period, during which the user is not authorized to submit additional requests. If the timestamp from the Bloom filter is within the expiration time period, the computing resource service may deny the request and update the Bloom filter elements to specify a timestamp that corresponds to a time when the request was received. However, if the timestamp from the Bloom filter is not within the expiration time period, the computing resource service may fulfill the request and update the Bloom filter elements to incorporate the timestamp for when the request was received.

In another example, the computing resource service can utilize a Bloom filter to determine whether a previously received message is stored within a cache or has expired and, as a result, is no longer stored in the cache. A user of the computing resource service may submit a query to the computing resource service to determine whether a particular message is probably stored within a cache maintained by the computing resource service. Similar to the example described above, the computing resource service may utilize one or more elements of the message as an input into an entry function. The output of this function may be hashed and this hash result may be used to determine whether the requested digital message is stored within the cache or has expired and, as a result, has been purged from the cache. For instance, in response to the user's query, the computing resource service may evaluate the Bloom filter and obtain the timestamp corresponding to the digital message specified in the query. If the timestamp is within an expiration period for the cache, the computing resource service may determine that the message is probably within the cache and may access the cache to obtain the message for the user. However, if the timestamp is not within the expiration period for the cache, the computing resource service may determine that the message has expired and, as a result, is no longer within the cache. The computing resource service may notify the user to indicate that the message is no longer available.

The computing resource service may further utilize a Bloom filter to determine whether a new credential provided as part of a credential rotation scheme can be utilized by a user. For instance, if a user submits a new credential that it would like to use for authentication purposes, the computing resource service may utilize this new credential as an input into an entry function. The output of this function may be hashed and the result may be used to determine which elements of the Bloom filter are to be evaluated to determine whether the new credential may be used. If the elements of the Bloom filter corresponding to the output of the function have a null value (e.g., zero), the computing resource service may enable the user to utilize the credential. Similarly, the computing resource service may determine a difference between the credential iteration value of a current credential and the credential iteration value of the new credential. The service may compare this difference to a maximum credential expiration value to determine whether the new credential may be used. For instance, if the difference is less than this credential expiration value, the service may determine that the new credential cannot be used. However, if the difference is greater than the credential expiration value, then the service may determine that the new credential may be implemented. Further, the computing resource service may update the Bloom filter elements corresponding to the new credential to a new credential iteration value that is an incremental increase of the credential iteration value of the previous credential.

In this manner, a computing resource service may use a Bloom filter to determine expiration of elements within the Bloom filter over time. In addition, the techniques described and suggested herein facilitate additional technical advantages. For instance, because entries in the Bloom filter correspond to timestamps or iteration values that can be used to determine whether an entry has expired, computing resource services may use the earliest timestamp or the lowest iteration value in the event that an entry corresponds to conflicting timestamps or iteration values. Thus, a false positive determination resulting from use of the Bloom filter may still be used to determine a course of action in response to a request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user 102 of a computing resource service 104 may submit a request to access the computing resource service 104 to perform one or more actions. The computing resource service 104 may be one of many services operated by a computing resource service provider. The user 102 may issue a request for access to a computing resource service 104 (and/or a request for access to resources associated with the service 104) provided by a computing resource service provider. The request may be, for instance, a web service application programming interface request. The user may be an individual, or a group of individuals, or a role associated with a group of individuals, or a process representing one or more of these entities that may be running on one or more remote (relative to the computing resource service provider) computer systems, or may be some other such computer system entity, individual, or process. Each individual, group, role, or other such collection of users may have a corresponding user definition, group definition, role definition, or other definition that defines the attributes and/or membership of that collection. For example, a group may be a group of users that have the same geographical location. The definition of that group of users may include the membership of the group, the location, and other data and/or metadata associated with that group. As used herein, a user 102 is an entity corresponding to an identity managed by the computing resource service provider, where the computing resource service provider manages permissions for the identity and where the entity may include one or more sub-entities, which themselves may have identities.

The user 102 may provide, through the request to the computing resource service 104, one or more credentials that the computing resource service 104 may utilize to authenticate the user 102 and to identify any computing resource policies that may be applicable to the request. The one or more credentials may include a user name and corresponding password for the user 102 of the computing resource service 102, a symmetric cryptographic key, a private cryptographic key, message authentication codes, a combination of any of the previously identified items or information derived from (e.g., a hash of) any of the previously identified items or a combination thereof. In some examples, requests submitted to the service 104 are digitally signed by the user 102 (i.e., by a computing device used by or operating on behalf of the user 102) using a symmetric cryptographic key that is shared between the user 102 and the computing resource service 104. The computing resource service 104, therefore, may use a copy of the symmetric cryptographic key to verify digital signatures of requests purported to have been generated by the user 102. However, in other embodiments, the computing resource service 104 may utilize asymmetric cryptography for digital signature verification such as, for example, in response to the user 102 digitally signing requests using a private cryptographic key. In such embodiments, the computing resource service 104 may trust a certificate authority that digitally signed a certificate of the user 102 corresponding to the private cryptographic key. Consequently, in some embodiments, the computing resource service 104 may use a public cryptographic key specified by the certificate.

If the request is successfully authenticated by the computing resource service 104, the computing resource service 104 may evaluate a Bloom filter 106 to determine whether the user 102 has submitted a previous request to access the computing resource service 104 within a throttling threshold time period. For instance, in an embodiment, the computing resource service 104 utilizes the one or more credentials provided by the user 102 as input into an entry function to obtain an output value. The computing resource service 104 may query the Bloom filter 106 to determine whether this output value is present within the Bloom filter 106. For instance, in order to determine whether the output value is present within the Bloom filter 106, the computing resource service 104 may pass the output value through the Bloom filter 106, which may determine whether a series of elements corresponding to the output in the Bloom filter 106 are set to zero or some other non-zero value. If the series of elements corresponding to the output in the Bloom filter 106 are set to non-zero values, the computing resource service 104 may deem the output value to be present in the Bloom filter 106. It should be noted that determining which elements of the Bloom filter 106 correspond to the output is similar to methods utilized to determine which bits of a traditional Bloom filter are to be evaluated to determine whether an output value is present within the Bloom filter.

In an embodiment, each element of the Bloom filter 106 can be either a null value (e.g., zero) or correspond to a timestamp. A timestamp may correspond to a wall-clock time, Unix epoch time, Win32 FILETIME, Disk Operating System (DOS) date/time, Object Linking and Embedding (OLE) automation date, a value of a counter defined by the computing resource service 104, and the like. If the computing resource service 104 determines that the elements corresponding to the output value are set to non-zero values (e.g., a timestamp), the computing resource service 104 may evaluate these non-zero values to determine whether the request for access to the computing resource service 104 should be fulfilled or denied. For instance, the computing resource service 104 may obtain, from the Bloom filter 106, a timestamp corresponding to the time during which a previous request from the user 102 utilize the provided one or more credentials was processed by the computing resource service 104. In an embodiment, the computing resource service 104 determines a time period between the present time and the time specified in the timestamp from the Bloom filter 106. The computing resource service 104 may compare this time period to a throttling time period to determine whether the time period is greater than the throttling time period.

If the time period calculated by the computing resource service 104 is shorter than the throttling time period, the computing resource service 104 may determine that an insufficient amount of time has passed since the user's prior request to access the service 104 and the present request. Thus, based at least in part on this determination, the computing resource service 104 may deny the user's request. Additionally, in some embodiments, the computing resource service 104 updates the elements corresponding to the output value of the entry function in the Bloom filter 106 to specify a timestamp corresponding to when the present request from the user 102 was received. Thus, if the request is denied by the computing resource service 104, the computing resource service 104 may reset the time period between requests from the user 102. This may cause the user 102 to have to delay future requests until the throttling period has passed.

In an embodiment, if the time period calculated by the computing resource service 104 is longer than the throttling time period, the computing resource service 104 determines that a sufficient amount of time has passed since the user's prior request to access the service 104 and the present request. In response to such a determination, the computing resource service 104 may fulfill the user's request to access the computing resource service 104. Further, the computing resource service 104 may update the elements corresponding to the output value of the entry function in the Bloom filter to specify a timestamp corresponding to when the present request from the user 102 was received.

If the elements corresponding to the output value of the entry function are set to a null value, the computing resource service 104 may determine that no prior requests from the user 102 have been received. As a result, the computing resource service 104 may fulfill the request. Further, the computing resource service 104 may update the elements corresponding to the output value of the entry function in the Bloom filter to specify a timestamp corresponding to when the present request from the user 102 was received. Since these elements may now be set to a non-zero value in the Bloom filter 106, the computing resource service 104 may later determine, in response to future requests from the user 102, that the output value of the entry function corresponding to the user's provided one or more credentials are in the Bloom filter 106. This may enable the computing resource service 104 to evaluate future user 102 requests to access the computing resource service 104 to determine whether these requests are submitted within the throttling time period defined by the computing resource service 104.

It should be noted that while Bloom filters 106 are used extensively throughout the present disclosure for illustrative purposes, other probabilistic data structures may be used. A probabilistic data structure, in an embodiment, is a data structure configured such that, when maintained correctly, a query against the data structure (e.g., to determine whether an element is in a set) has a non-zero probability of being incorrect (e.g., due to a hash collision). For instance, in some embodiments, a probabilistic data structure is configured such that the probability of a false positive is below a specified threshold to balance the computational efficiency provided by the data structure with the inconvenience caused by security actions that are unnecessarily performed as a result of a false positive. Other techniques to mitigate against false positives, such as by reference to a database only when a violation is potentially detected, may be used such that additional computing resources are used to make sure there was a violation only when the potential of a violation having occurred has been detected.

Generally, the techniques described herein can be applied in various ways, using various algorithms and data structures. For example, a probabilistic data structure may be updated using an algorithm that operates probabilistically such that there is a small, but nonzero probability that two different inputs can result in the same update to the probabilistic data structure. In many examples, such as extensions of Bloom filters such as described above and below, when an entry is added to the probabilistic data structure, multiple elements (e.g., elements of an array, if an array is used) of the probabilistic data structure may be updated (e.g., may be updated to store a timestamp or other value indicative of a point in time or other value). A first element may, as a result of being added to the probabilistic data structure, result in a first plurality of elements of the probabilistic data structure being updated and a second element may, as a result of being added to the probabilistic data structure, result in a second plurality of elements of the probabilistic data structure being updated. The algorithm for adding an element to the probabilistic data structure may result in a nonzero probability of the first probability of elements and the second plurality of elements having a non-empty intersection (i.e., overlap). In some examples, there may be a first nonzero probability that the first plurality and second plurality are the same and also a second nonzero probability that the first plurality and the second plurality have a nonempty intersection but are not the same. In some embodiments, the first nonzero probability is higher than the second nonzero probability. In a specific example, the same algorithm (e.g., use of k hash functions to determine n positions in a bit array, where k is a positive integer) that is used to determine which bits of a bit array to change when adding an entry to a conventional Bloom filter is also used to determine which entries of a probabilistic data structure are to be updated. Other examples and adaptations are also considered as being within the scope of the present disclosure.

In an embodiment, if the output value of the entry function results in two or more conflicting timestamps being obtained from the Bloom filter 106, the computing resource service 104 selects the earliest timestamp from these elements and performs one or more operations based at least in part on this timestamp. For instance, if the computing resource service 104 obtains from the Bloom filter 106, based at least in part on the output value to the entry function, a timestamp that is beyond the range of the throttling time period (e.g., earlier than the earliest time bound for the throttling period) and a timestamp that is within the range of the throttling time period, the computing resource service 104 may select the timestamp that is beyond the range of the throttling time period and fulfill the user request. Further, the computing resource service 104 may update the corresponding elements in the Bloom filter 106 to specify the timestamp of the present request. It should be noted that the computing resource service 104 may perform other alternative operations if there is a conflict among the timestamps obtained from the Bloom filter 106. For instance, the computing resource service 104 may identify one or more policies that are associated with the request to determine whether any of these one or more policies may be used to supersede a determination made based at least in part on the Bloom filter 106 query.

Figure 2:
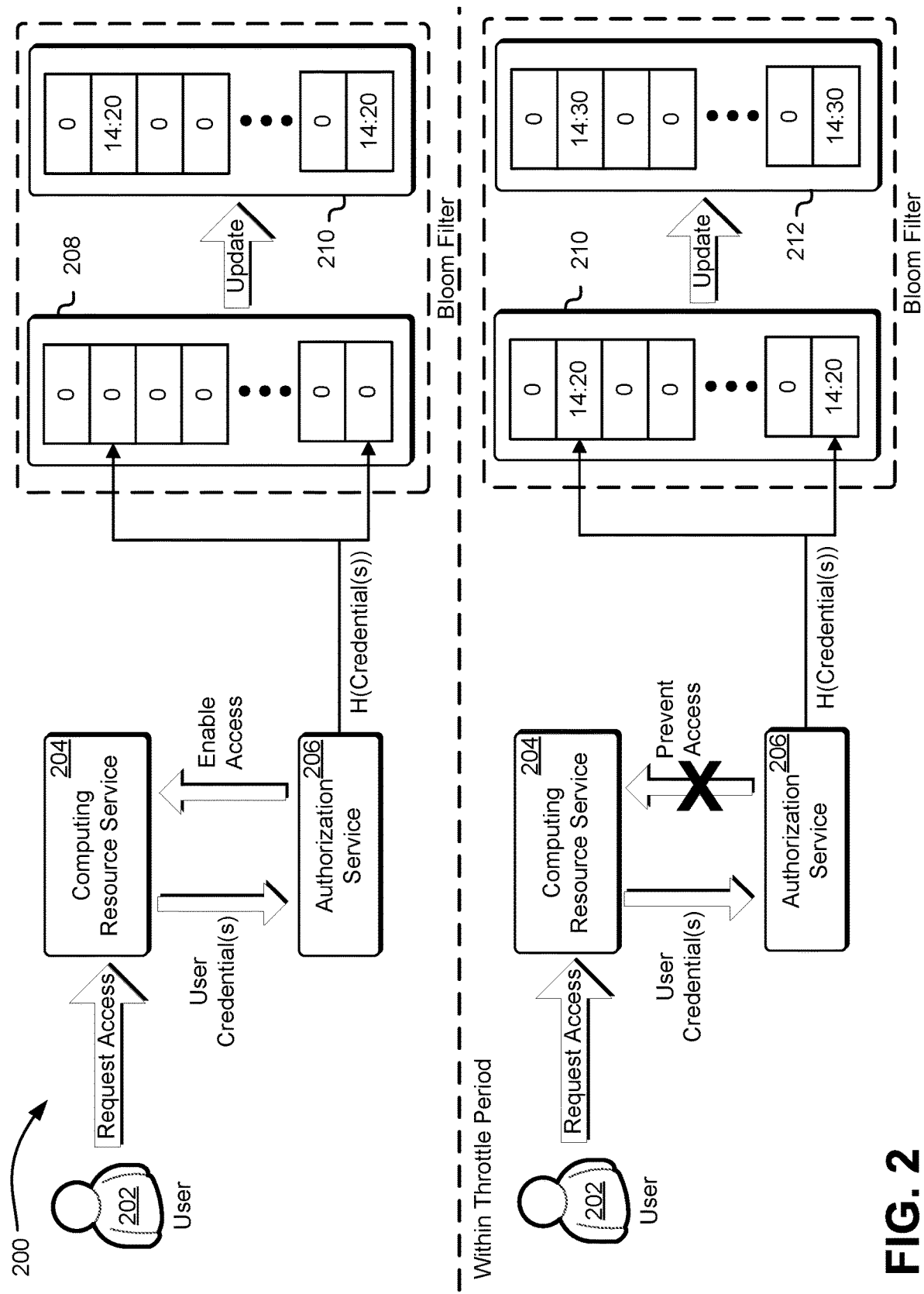
FIG. 2 shows an illustrative example of an environment in which a Bloom filter is utilized to determine whether a request for access to a computing resource service is fulfilled in accordance with at least one embodiment.

As noted above, a computing resource service can use a Bloom filter specifying timestamps corresponding to previously received user requests to determine whether to fulfill a user request to access the computing resource service. Accordingly, FIG. 2 shows an illustrative example of an environment 200 in which a Bloom filter is utilized to determine whether a request for access to a computing resource service is fulfilled in accordance with at least one embodiment. In the environment 200, a user 202 of the computing resource service 204 submits a request to access the computing resource service 204. The request may include a set of credentials that may be used to authenticate the user 202 and to determine whether the user 202 is authorized to access the computing resource service 204.

In response to the request, the computing resource service 204 may transmit the request and the user's set of credentials to an authorization service 206 for a determination as to whether the user 202 is authorized to access the computing resource service 204. The authorization service 206 may be a stand-alone service or may be part of a service provider or other entity. The authorization service 206, in an embodiment, is a computer system configured to perform operations involved in authentication of users and in the determination of whether users are authorized to access the computing resource service 204 or any other service provided by the computing resource service provider. If the request is successfully authenticated, the authorization service 206 may obtain policies applicable to the request. A policy may be applicable to the request by way of being associated with the user 202, a resource to be accessed as part of fulfillment of the request, a group in which the user 202 is a member, a role the user 202 has assumed, and/or otherwise. To obtain policies applicable to the request, the authorization service 206 may transmit a query to a policy database managed by a policy management service.

Having obtained any policies applicable to the request, the authorization service 206 may determine whether the user 202 is authorized to access the computing resource service 204. If the user 202 cannot be authenticated by the authorization service 206 or is otherwise not authorized to access the computing resource service 204, the authorization service 206 may transmit a response to the computing resource service 204 indicating that the request from the user 202 should be denied. This response may cause the computing resource service 204 to deny the request from the user 202. In an embodiment, based at least in part on the policies obtained from the policy database, the authorization service 206 determines that the user 202 is authorized to access the computing resource service 204, the authorization service 206 uses the provided user credentials as input into an entry function to obtain an output value. The authorization service 206 may query a Bloom filter 208 to determine whether this output value is present within the Bloom filter 208. As illustrated in FIG. 2, the Bloom filter 208 is a newly generated element array whereby each element of the element array is set to a null value (e.g., zero). This may denote that there are no entries present within the Bloom filter 208.

If the authorization service 206 determines that the elements in the Bloom filter 208 corresponding to the output value of the entry function are set to a null value, the authorization service 206 may update the elements corresponding to the output value of the entry function to denote a timestamp that is representative of when the request from the user 202 to access the computing resource service 204 was received by the computing resource service 204, resulting in an updated Bloom filter 210. In response to the determination that the elements corresponding to the output value of the entry function were originally set to a null value, the authorization service 206 may transmit a response to the computing resource service 204 that may cause the computing resource service 204 to fulfill the request. The timestamps in the updated Bloom filter 210 may be used to determine, in response to future requests, whether the user 202 has submitted too many requests within a throttling time period for user requests. For instance, the computing resource service 204 may prevent users from submitting more than a single request within a particular time period. Thus, in order for a future user request to be fulfilled, it may need to be submitted after the time period has elapsed.

For instance, as illustrated in FIG. 2, in response to a user request 202 to access the computing resource service 204 within this throttling time period, the authorization service 206 uses the user's set of credentials as input into the entry function to obtain the output value. The authorization service 206 may use this output value and the updated Bloom filter 210 to determine the elements in the updated Bloom filter 210 that correspond to this output value. If the elements corresponding to the output value specify a particular timestamp, the authorization service 206 may calculate, based at least in part on the timestamp obtained from the updated Bloom filter 210 and a timestamp corresponding to when the user request was received by the computing resource service 204, a differential time period for user requests. The authorization service 206 may compare this differential time period for user requests to the throttling time period established by the computing resource service 204 to determine whether the differential time period is longer or shorter than the throttling time period.

If the differential time period for user requests is shorter than or equal to the throttling time period defined by the computing resource service 204, the authorization service 206 may transmit a response to the computing resource service 204 indicating that the computing resource service 204 should prevent user access to the computing resource service 204. This may cause the computing resource service 204 to deny the request and to transmit a notification to the user 202 to indicate that the user 202 needs to wait until the throttling time period has passed before submitting another request to access the computing resource service 204. Additionally, as illustrated in FIG. 2, the authorization service 206 can update the updated Bloom filter 210 to generate a second updated Bloom filter 212. The elements of this second updated Bloom filter 212 corresponding to the output value of the entry function specify a timestamp corresponding to when the present user request was received by the computing resource service 204. Thus, the throttling time period for the user 202 may be reset such that the user 202 may be required to wait the entire throttling time period before a request can be fulfilled by the computing resource service 204. Alternatively, the authorization service 206 may only transmit the response to the computing resource service 204 without updating the updated Bloom filter 210 to specify the timestamp corresponding to when the present user request to access the computing resource service 204 was received.

However, if the differential time period for user requests is longer than the throttling time period defined by the computing resource service 204, the authorization service 206 may transmit a response to the computing resource service 204 indicating that the request should be fulfilled. Further, the authorization service 206 may update the elements corresponding to the output value to specify the timestamp corresponding to when the present request for access to the computing resource service 204 was received. Thus, the throttling time period for the user 202 may begin anew. In response to a new request from the user 202 or any other users, the authorization service 206 may utilize the second updated Bloom filter 212 to determine whether the computing resource service 204 is to fulfill the request or to deny the request.

In some embodiments, if the authorization service 206 determines that the elements corresponding to the output value of the entry function specify different timestamp values, the authorization service 206 may select the earliest timestamp. For instance, if the authorization service 206 obtains, from the updated Bloom filter 210 a timestamp that falls within the throttling time period and a timestamp that falls beyond the throttling time period, the authorization service 206 may utilize the earliest timestamp and determine that the throttling time period does not apply to the user 202. Thus, the authorization service 206 may cause the computing resource service 204 to fulfill the request. Alternatively, if there is a hash collision, the authorization service 206 may evaluate the policies associated with the request to determine whether there are any permissions that may be used to supersede the need to utilize the updated Bloom filter 210 to determine whether the request may be fulfilled or denied. For instance, if the user 202 is authorized, by virtue of the one or more policies, to access the computing resource service 204 at any time, the authorization service 206 may transmit a response to the computing resource service 204 to enable the user 202 to access the service 204.

It should be noted that while timestamps are used extensively throughout the present disclosure for the purpose of illustration, other values may be utilized within a Bloom filter to denote the time at which a request was received. For example, the values specified in the elements of the Bloom filter may be values that increase over time or that may decrease over time as time moves forward. As an illustrative example, the authorization service 206 may enter the negative of the timestamp into the Bloom filter (with some reference time as the zero time, such as UNIX epoch time). Over time, the values in the Bloom filter may decrease. Thus, the values in the Bloom filter may have semantic meaning (e.g., points in time) and the authorization service 206 may operate in accordance with the semantic meaning (e.g., determine how to process requests in accordance with values stored in the Bloom filter). In other instances, the elements of the Bloom filter may be initialized with non-zero values and decrement each time an entry is added to the Bloom filter.

Figure 3:
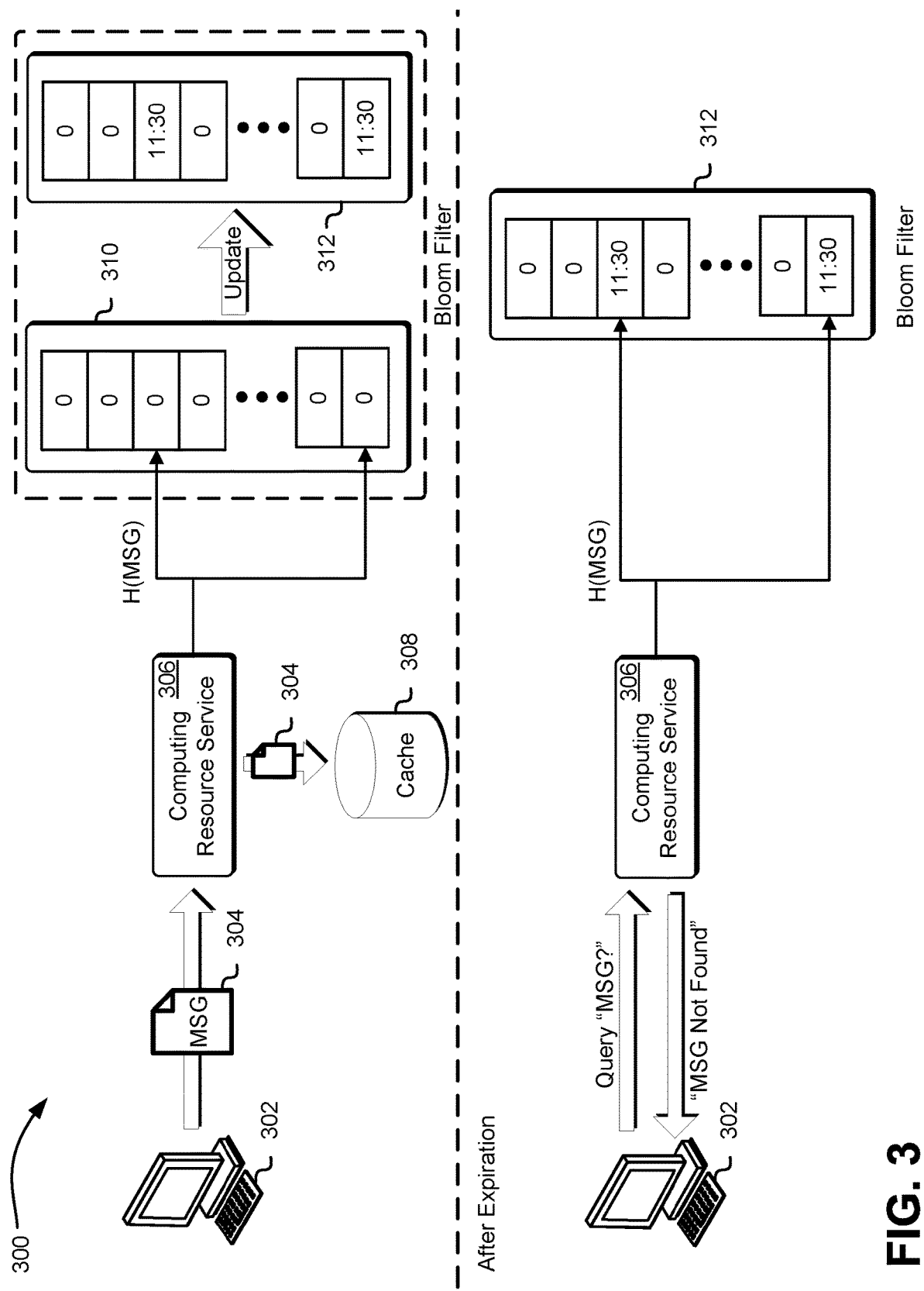
FIG. 3 shows an illustrative example of an environment in which a Bloom filter is utilized to determine whether a message is stored within a cache in response to a request to obtain the message in accordance with at least one embodiment.

A computing resource service may utilize a Bloom filter to determine whether a particular message or other data stored in a cache has expired and has been removed from the cache. For instance, if a user submits a query to the computing resource service to determine whether a message is present within a service cache, the computing resource service may utilize a Bloom filter to determine whether the message has expired. If so, the computing resource service may indicate that the message is no longer available or could not be found. Accordingly, FIG. 3 shows an illustrative example of an environment 300 in which a Bloom filter is utilized to determine whether a message 304 is stored within a cache 308 in response to a request to obtain the message in accordance with at least one embodiment.

In the environment 300, a user, through a user client device 302 or other computing device, submits a digital message 304 to the computing resource service 306. In response to receiving to the digital message 304 from the user client device 302, the computing resource service 306 may store the digital message 304 in a cache 308. The cache 308 may comprise one or more storage devices that may be used to digitally store data, such as the message 304 and other messages, for a limited period of time. Data stored within the cache 308 longer than the limited period of time may be automatically purged from the cache 308 in order to provide greater storage capacity for more recently received data.

In response to receiving a digital message 304 from the user client device 302, the computing resource service 306 may store the digital message in the cache 308 and update a Bloom filter 310 to specify a timestamp corresponding to a time at which the digital message was stored in the cache 308. For instance, the computing resource service 306 may utilize an identifier for the digital message 304, the contents of the digital message 304, or a portion of the contents of the digital message 304 as input into an entry function to obtain an output value. The output value of this function may be hashed and this hash result may be used to determine which elements of the Bloom filter 310 are to be evaluated. As illustrated in FIG. 3, the computing resource service 306 may determine that the elements of the Bloom filter 310 corresponding to the hash result are set to a null value (e.g., zero). The computing resource service 306 may update these elements of the Bloom filter 310 to specify a timestamp corresponding to a time at which the computing resource service 306 added the message 304 to the cache. Thus, the updated Bloom filter 312 may be used to determine whether the digital message 304 is in the cache 308.

If the user client device 302 submits a query to the computing resource service 306 to determine whether a particular message is available, the computing resource service 306 may evaluate the updated Bloom filter 312 to determine whether the digital message is probably stored within the cache 308 or has expired and, as a result, has been purged from the cache 308. In an embodiment, the user client device 302 may provide an identifier corresponding to the digital message being queried, the contents of the digital message, or a portion of the contents of the digital message to the computing resource service 306. The computing resource service 306 may utilize this information as input into an entry function to obtain an output value. The computing resource service 306 may hash this output value to obtain a hash result that may be used to determine which elements of the updated Bloom filter 312 are to be evaluated.

Based at least in part on the information encoded into each element corresponding to the hash result obtained, the computing resource service 306 may determine whether the digital message is stored within the cache 308 or is not available. For example, as illustrated in FIG. 3, the computing resource service 306 has determined that the elements corresponding to the hash result specify a timestamp. The computing resource service 306 may evaluate this timestamp to determine whether the requested digital message has expired or is still stored within the cache 308. The computing resource service 306 may identify, based at least in part on the timestamp obtained from the updated Bloom filter 312 and the time during which the query was received, an expiration time period for the requested digital message. If the expiration time period exceeds the maximum storage time threshold for digital messages, the computing resource service 306 may determine that the requested digital message has expired and is no longer stored within the cache 308. In response to this determination, the computing resource service 306 may transmit a notification to the user client device 302 indicating that the requested digital message could not be found. The notification may further specify the reasons for which the requested digital message could not be found, namely that the digital message has been automatically purged from the cache 308 upon expiration.

If the computing resource service 306 determines that the expiration time period for the digital message does not exceed the maximum storage time threshold for digital messages, the computing resource service 306 may determine that the requested digital message is stored within the cache 308. This may cause the computing resource service 306 to access the cache 308 and obtain the digital message. The computing resource service 306 may provide the digital message to the user client device 302 in response to the query. However, if the computing resource service 306 determines that the elements corresponding to the hash result are set to a null value, the computing resource service 306 may determine that the requested digital message has not been previously observed and, thus, is not stored within the cache 308. This may cause the computing resource service 306 to transmit a notification to the user client device 302 indicating that the requested digital message could not be found.

In some embodiments, if the computing resource service 306 determines that the elements corresponding to the output value of the entry function specify different timestamp values (e.g., a timestamp and null values, a timestamp indicating expiration and a timestamp indicating active messages, etc.), the computing resource service 306 will access the cache 308 to determine whether the requested digital message is available. The computing resource service 306 may transmit the digital message from the cache 308 to the user client device 302 of it is able to obtain the digital message from the cache 308. However, if the computing resource service 306 is unable to obtain the requested digital message from the cache 308, the computing resource service 306 may indicate that the digital message is not available.

Figure 4:
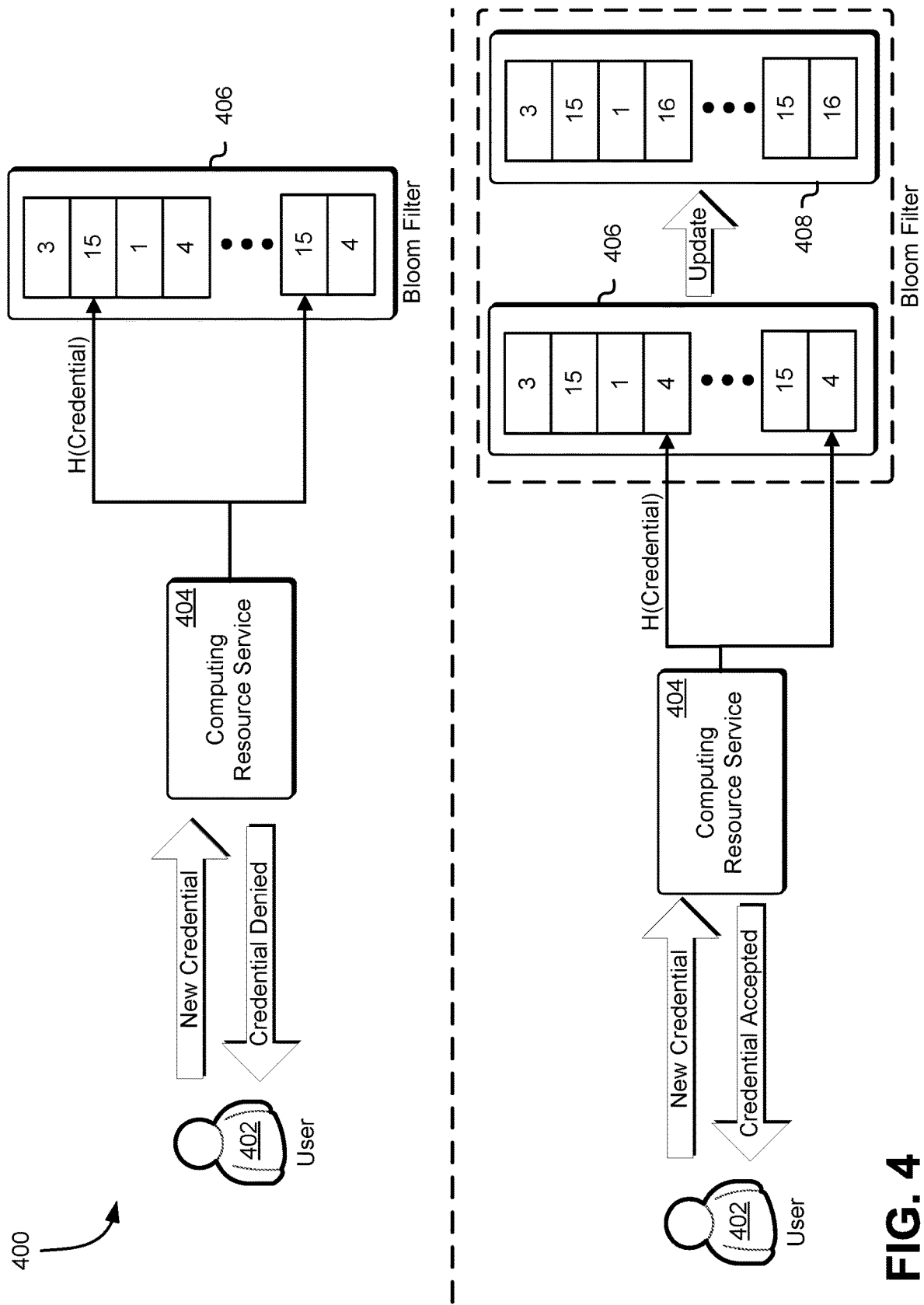
FIG. 4 shows an illustrative example of an environment in which a Bloom filter is utilized to determine whether a new credential provided for credential rotation can be implemented in accordance with at least one embodiment.

A computing resource service may utilize a Bloom filter as part of a credential rotation scheme to determine whether a new credential provided by a user may be used. Accordingly, FIG. 4 shows an illustrative example of an environment 400 in which a Bloom filter is utilized to determine whether a new credential provided for credential rotation can be implemented in accordance with at least one embodiment. In the environment 400, a computing resource service 404 may transmit a notification to a user 402 requesting that the user 402 provide a new credential that can be used to access the computing resource service 404. For instance, the computing resource service 404 may implement a policy whereby a user 402 is required to rotate its credentials after a particular period of time. Further, the computing resource service 404 may implement an additional policy whereby a user 402 may not provide a credential that has been used previously. For instance, a user 402 may not be permitted to provide a new credential that is part of a set of previously used credentials. As an illustrative example, a user 402 may not provide a new credential that is one of the last fifteen credentials used by the user 402 to access the computing resource service 404.

In an embodiment, the computing resource service 404 configures and uses a Bloom filter 406 to determine whether a new credential provided by a user 402 may be implemented to enable the user 402 to access the computing resource service 404. For instance, the computing resource service 404 may obtain the credential that the user 402 wants to utilize for access to the computing resource service 404. The computing resource service 404 may utilize this new credential as input into an entry function to obtain an output value. The computing resource service 404 may hash this output value to obtain a hash result that corresponds to one or more elements of the Bloom filter 406. Additionally, the computing resource service 404 may utilize the current credential utilized by the user 402 to access the service 404 as input into the entry function to obtain an output value that corresponds to this credential. The computing resource service 404 may evaluate the elements of the Bloom filter 406 that correspond to this credential to obtain a credential iteration value for the credential currently being used to access the service 404.

The elements of the Bloom filter 406 corresponding to the new credential provided by the user 402 may specify a credential iteration value that may be used to determine whether a credential is part of a set of credentials that have been used by the user 402 and cannot be implemented. For instance, the computing resource service 404 may calculate the difference between the credential iteration value of the new credential provided by the user 402 and the credential iteration value of the current credential utilized to access the service 404. The service 404 may compare the result of this calculation to a credential expiration value to determine whether the new credential is a member of a set of credentials that cannot be implemented. The credential expiration value may denote the number of previously utilized credentials that cannot be implemented by the service 404. For example, if a user 402 cannot use any of the last fifteen credentials as a new credential (e.g., credential expiration value is equal to fifteen), the computing resource service 404 may calculate the difference between the credential iteration value of the new credential provided by the user 402 and the credential iteration value of the credential currently being used by the user 402 to access the service 404. If the calculated difference is greater than fifteen, then the computing resource service 404 may determine that the new credential may be implemented. However, if the calculated difference is less than fifteen, then the service 404 may determine that the new credential is a member of a set of credentials that cannot be implemented. Thus, the computing resource service 404 may deny the new credential if the calculated difference is less than fifteen. As illustrated in FIG. 4, the computing resource service 404 determines, based at least in part on the hash result generated using the new credential provided by the user 402, that the new credential has been used previously and has a credential iteration value of fifteen. If the computing resource service 404 has implemented a policy whereby the user 402 cannot implement any of the last fifteen credentials to access the computing resource service 404, the computing resource service 404 may deny the provided credential and request that the user 402 provide a different credential.

If the elements of the Bloom filter 406 corresponding to the hash result are set to a null value (e.g., zero), the computing resource service 404 may determine that the provided credential has not been previously used by the user 402. Accordingly, the computing resource service 404 may implement the new credential provided by the user 402 and transmit a notification to the user 402 to indicate that it can use the new credential to access the computing resource service 404. In an embodiment, the computing resource service 404 updates the elements corresponding to the hash result for the output value to a non-zero value. For instance, the computing resource service 404 may increment the credential iteration value from zero to one to denote presence of an entry corresponding to the new credential in the Bloom filter 406. Thus, if the user 402, at a later time, attempts to provide the same credential as part of a credential rotation scheme, the computing resource service may deny the use of this credential if the difference between the credential iteration value of this credential and the credential iteration value of the current credential is less than the credential expiration value.

In an embodiment, the computing resource service 404 also updates the elements of the Bloom filter 406 associated with the new credential if the difference in credential iteration values is greater than the credential expiration value. The computing resource service 404 may increment the current credential iteration value of the credential utilized by the user 402 to access the service 404 and that is about to be phased out in favor of the new credential. The computing resource service 404 may update the elements of the Bloom filter 406 associated with the new credential to specify this new credential iteration value. For instance, as illustrated in FIG. 4, the computing resource service 404 updates the elements corresponding to the hash result for the new credential from four (e.g., previous credential iteration value for the new credential) to sixteen (e.g., new credential iteration value calculated by incrementing the previous value of fifteen by one), resulting in an updated Bloom filter 408 to indicate that the new credential has been implemented.

If the computing resource service 404 evaluates the Bloom filter 406 in response to receiving a proposed new credential from the user 402 and determines that the elements corresponding to the hash result for the proposed new credential do not specify the same credential iteration value, the computing resource service 404 may apply the lowest credential iteration value from these elements. For instance, if the elements corresponding to the hash result correspond to both an iteration value that corresponds to a set of previously used credentials that cannot be implemented for use and an iteration value that does not correspond to the set of previously used credentials that cannot be implemented, the computing resource service 404 may utilize the lower iteration value and determine that the user 402 can utilize the new credentials to access the computing resource service 404.

Figure 5:
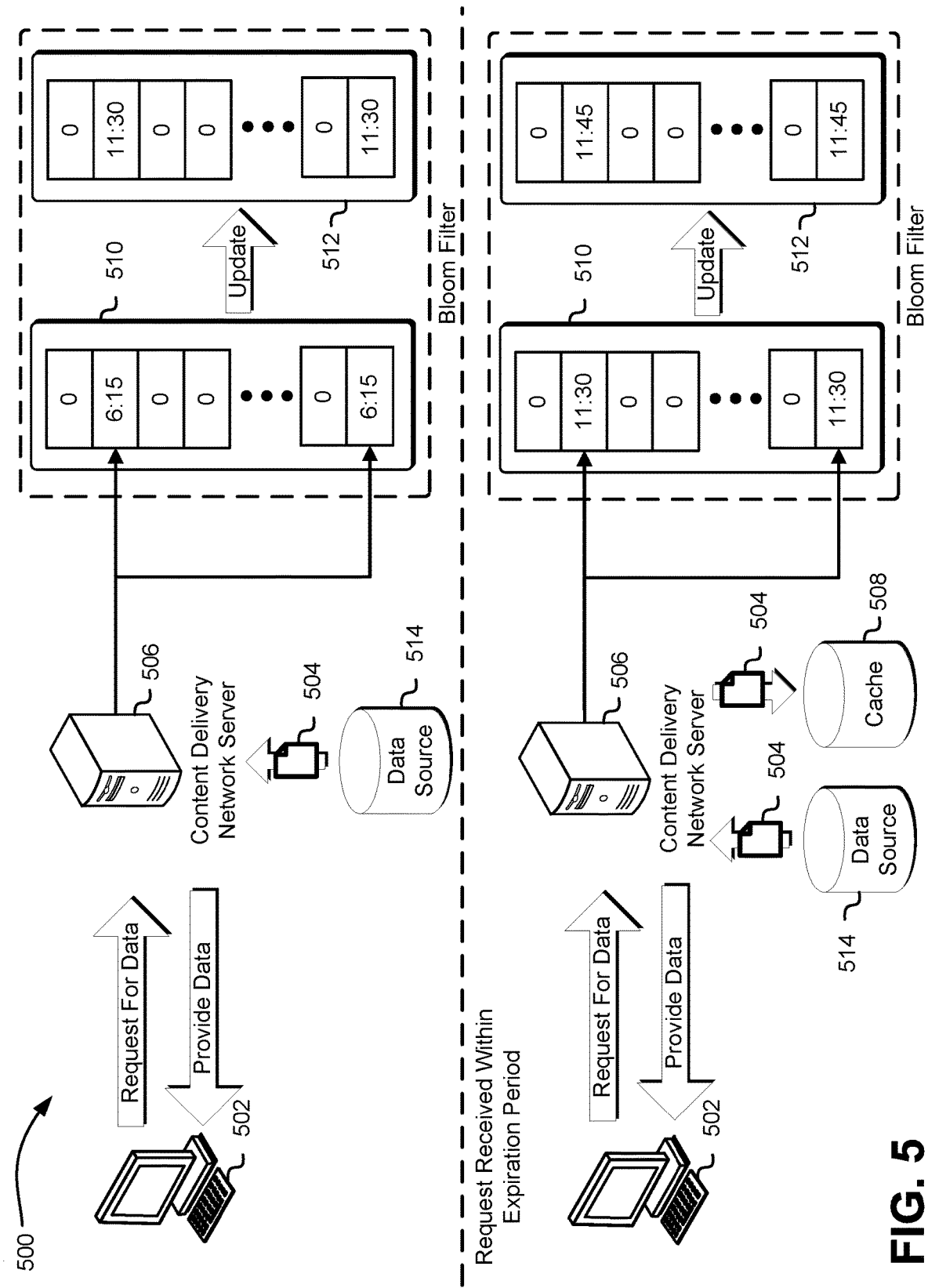
FIG. 5 shows an illustrative example of an environment in which a Bloom filter is utilized by a server of a Content Delivery Network to determine whether to store data within a cache in response to requests to retrieve the data in accordance with at least one embodiment.

FIG. 5 shows an illustrative example of an environment 500 in which a Bloom filter is utilized by a server in a Content Delivery Network (CDN) to determine whether to store data 504 within a cache in response to requests to retrieve the data 504 in accordance with at least one embodiment. In the environment 500, a client device 502 transmits a request to a CDN server 506 to obtain data 504. The client device 502 may be utilized by an end user, whereby the request from an end user is to obtain data 504, such as web objects, downloadable objects, applications, streaming media (e.g., on-demand, live, etc.), and the like. The request may specify a web address or other Uniform Resource Identifier (URI) that may be used to identify the origin server comprising data 504 to be retrieved from a particular web domain.

In response to the request, the CDN server 506 may utilize one or more elements of the request as input to an entry function to obtain an output value. For instance, the CDN server 506 may utilize the URI or web address as specified in the request as input into the entry function. Alternatively, the CDN server 506 may utilize the domain name specified in the URI to determine a corresponding Internet Protocol (IP) address that may be used as input into the entry function. The CDN server 506 may use this output value obtained from the entry function as an entry that may be in the Bloom filter 510. Thus, the CDN server 506 may query the Bloom filter 510 for the entry (e.g., output value of the entry function) corresponding to the received request.

In response to the query, the CDN server 506 may obtain, from the Bloom filter 510, a timestamp corresponding to a time at which a previous request to obtain the same data 504 was received. If the entry corresponding to the received request is not present in the Bloom filter 510, the CDN server 506 may determine that no requests have been previously received to obtain the same data 504. The CDN server 506 may utilize this timestamp to determine whether the frequency at which requests for the data 504 are received is greater than a frequency threshold. For instance, based at least in part on a time at which the request for data 504 is received and an expiration time period for requests used to determine the frequency threshold, the CDN server 506 may determine whether requests for the data 504 are received at a greater or lesser frequency than the frequency threshold. For instance, if the CDN server 506 determines, based at least in part on the timestamp obtained from the Bloom filter 510, the time at which the present request was received, and the expiration time period, that the request frequency is greater than the frequency threshold, the CDN server 506 may provide the data 504 to the client device 502 and store the data 504 within a cache 508. However, if the request frequency is less than the frequency threshold, the CDN server 506 may not store the data 504 within the cache 508.

As illustrated in FIG. 5, if the CDN server 506 maintains an expiration period of five hours, and the CDN server 506 determines that the difference between timestamp corresponding to a previous request received to obtain the data 504 (e.g., 6:15) and the time at which the present request was received (e.g., 11:30) is greater than this expiration period, the CDN server 504 may determine that the frequency at which requests are received to obtain the data 504 is less than the frequency threshold of a request every five hours. As a result, the CDN server 506 may obtain the data 504 from the data source 514 and provide the data 504 to the client device 502 without storing the data 504 in a cache 508. However, if the request from the client device 502 is received within the expiration period (e.g., the difference between the timestamp in the Bloom filter 510 and the time at which the request was received is less than the expiration period), the CDN server 506 may obtain the data 504 from the data source 514 and store the data 504 within a cache 508. This may enable the CDN server 506 to obtain the data 504 more quickly from the cache 508 in response to future requests to obtain the data 504.

In response to the request, the CDN server 506 may also update the elements of the Bloom filter 510, resulting in an update Bloom filter 512, that correspond to the entry to specify a timestamp that denotes a time at which the request from the client device 502 was received. Thus, as requests are processed by the CDN server 506, the CDN server 506 may continuously update the frequency analysis for incoming requests to obtain the data 504 to determine whether such requests are received at a frequency sufficient to enable storage of the data 504 within the cache 508. Similarly, if the frequency at which requests are received to obtain the data 504 decreases to a point below the frequency threshold, the CDN server 506 may remove the data 504 from the cache 508 and resume obtaining the data 504 from the data source 514.

Figure 6:
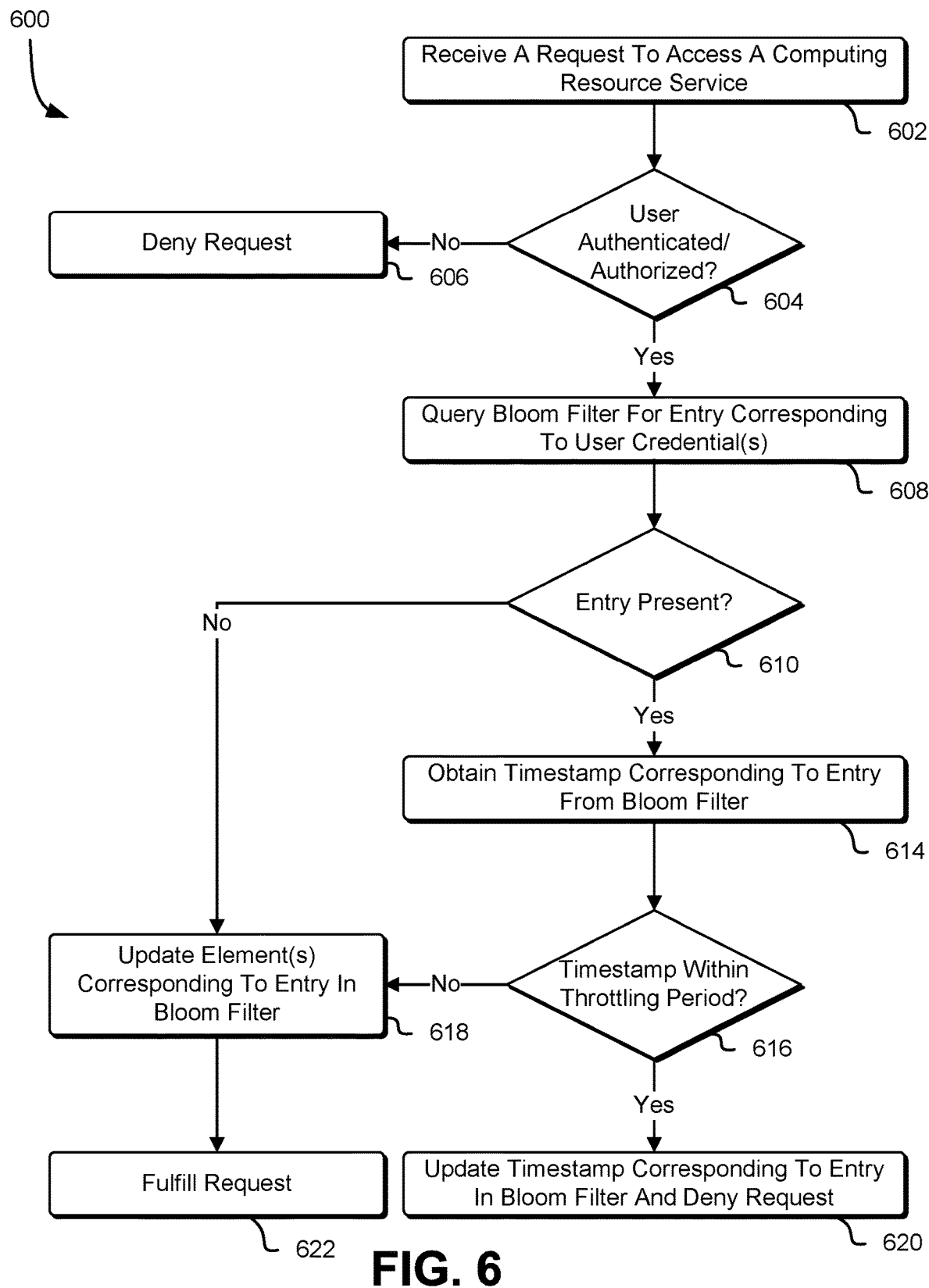
FIG. 6 shows an illustrative example of a process for utilizing a Bloom filter to determine whether to throttle an incoming request based at least in part on previously processed requests from the requestor in accordance with at least one embodiment.

As noted above, a computing resource service may utilize a Bloom filter to determine whether a request to access the computing resource service is to be denied as a result of the user having submitted the request during a throttling period for the user. Accordingly, FIG. 6 shows an illustrative example of a process 600 for utilizing a Bloom filter to determine whether to throttle an incoming request based at least in part on previously processed requests from the requestor in accordance with at least one embodiment. The process 600 may be performed by the aforementioned computing resource service in conjunction with an authorization service that may determine whether the user is authorized to access the computing resource service. In some embodiments, the authorization service may perform other operations on behalf of the computing resource service, such as evaluating the Bloom filter to determine whether to have the user's request denied.

At any time, the computing resource service may receive 602 a request to access the computing resource service. A user may provide, through the request to the computing resource service, one or more credentials that the computing resource service may utilize to authenticate the user and to identify any computing resource policies that may be applicable to the request. The one or more credentials may include a user name and corresponding password for the user of the computing resource service, a symmetric cryptographic key, a private cryptographic key, message authentication codes, a combination of any of the previously identified items or information derived from (e.g., a hash of) any of the previously identified items or a combination thereof. In some examples, requests submitted to the service are digitally signed by the user.

In response to the request, the computing resource service may transmit the request and the user's set of credentials to an authorization service to determine 604 whether the user can be authenticated and is further authorized to access the computing resource service. If the request is successfully authenticated, the authorization service may obtain policies applicable to the request. Having obtained any policies applicable to the request, the authorization service may determine whether the user is authorized to access the computing resource service. If the user cannot be authenticated by the authorization service or is otherwise not authorized to access the computing resource service, the authorization service may transmit a response to the computing resource service indicating that the request from the user should be denied. This response may cause the computing resource service to deny 606 the request from the user.

If the authorization service determines that the user is authorized to access the computing resource service and the user has been successfully authenticated, the authorization service may query 608 the Bloom filter for an entry corresponding to the user's provided credentials. The authorization service may utilize the user's credentials as input into an entry function to obtain an output value. The authorization service may hash this output value to obtain a hash output that corresponds to one or more elements of the Bloom filter. Based at least in part on the identified one or more elements of the Bloom filter, the authorization service may determine 610 whether the entry corresponding to the user's credentials is present within the Bloom filter. For instance, if the elements corresponding to the hash output are set to a null value (e.g., zero), the authorization service may determine that the entry is not in the Bloom filter.

If the authorization service determines that the entry corresponding to the user's credentials are not present in the Bloom filter, the authorization service may update 618 the elements corresponding to the entry in Bloom filter to add, for each identified element corresponding to the hash output, a timestamp that corresponds to when the request to access the computing resource service was received. Further, the authorization service may transmit a notification to the computing resource service to indicate that the request may be fulfilled. In response to this notification, the computing resource service may fulfill 622 the user's request to access the computing resource service.

However, if the authorization service determines that the entry corresponding to the user's credentials is present within the Bloom filter (e.g., the elements corresponding to the hash output are set to non-zero values), the authorization service may obtain 614, from the Bloom filter, the timestamp corresponding to the entry. As noted above, in response to a determination that a user may access the computing resource service, the authorization service may update the Bloom filter to add a timestamp corresponding to a time when the request to access the computing resource service was received. Thus, the timestamp specified in the elements corresponding to the entry may specify a time at which the user submitted a previous request to access the computing resource service. This timestamp may further represent the most recently received request from the user, not including the present request.

Based at least in part on the timestamp obtained from the Bloom filter, the authorization service may determine 616 whether the timestamp is within a throttling period for user requests. For instance, the computing resource service may implement a policy that a user may submit a request only after a particular period of time has elapsed since its previous request. This period of time may be defined as the throttling period for user requests. If the difference between the timestamp of the present request and the timestamp specified in the Bloom filter is less than the throttling period, the authorization service may update 620 the timestamp corresponding to the entry in the Bloom filter to the timestamp corresponding to the present request and transmit a notification to the computing resource service indicating that the request is to be denied. This may cause the computing resource service to deny the request.

However, if the timestamp specified in the Bloom filter is not within the throttling period for user requests, the authorization service may update 618 the elements corresponding to the entry in the Bloom filter to specify a timestamp corresponding to when the request was received. Further, the authorization service may transmit a notification to the computing resource service to indicate the request may be fulfilled. This may cause the computing resource service to fulfill 622 the request. Thus, the user may access the computing resource service and perform the requested one or more actions.

It should be noted that the process 600 may be performed using additional, fewer, or alternative operations. For instance, if the timestamp corresponding to the entry and obtained from the Bloom filter is within the throttling period for the user, the authorization service may forego updating the timestamp corresponding to the entry. Thus, the authorization service may not reset the throttling period for the user in response to its request. Instead, the authorization service may transmit the notification to the computing resource service to indicate that the request is to be denied. Thus, a user may not be penalized if it submits a request to access the computing resource service within a throttling period. In some embodiments, the authorization service transmits a notification to the computing resource service to suspend the request until the throttling period has passed. This may cause the computing resource service to fulfill the request from the user once the throttling period has passed without having to deny the request. The authorization service may update the Bloom filter to specify the timestamp corresponding to when the request was subsequently fulfilled.

Figure 7:
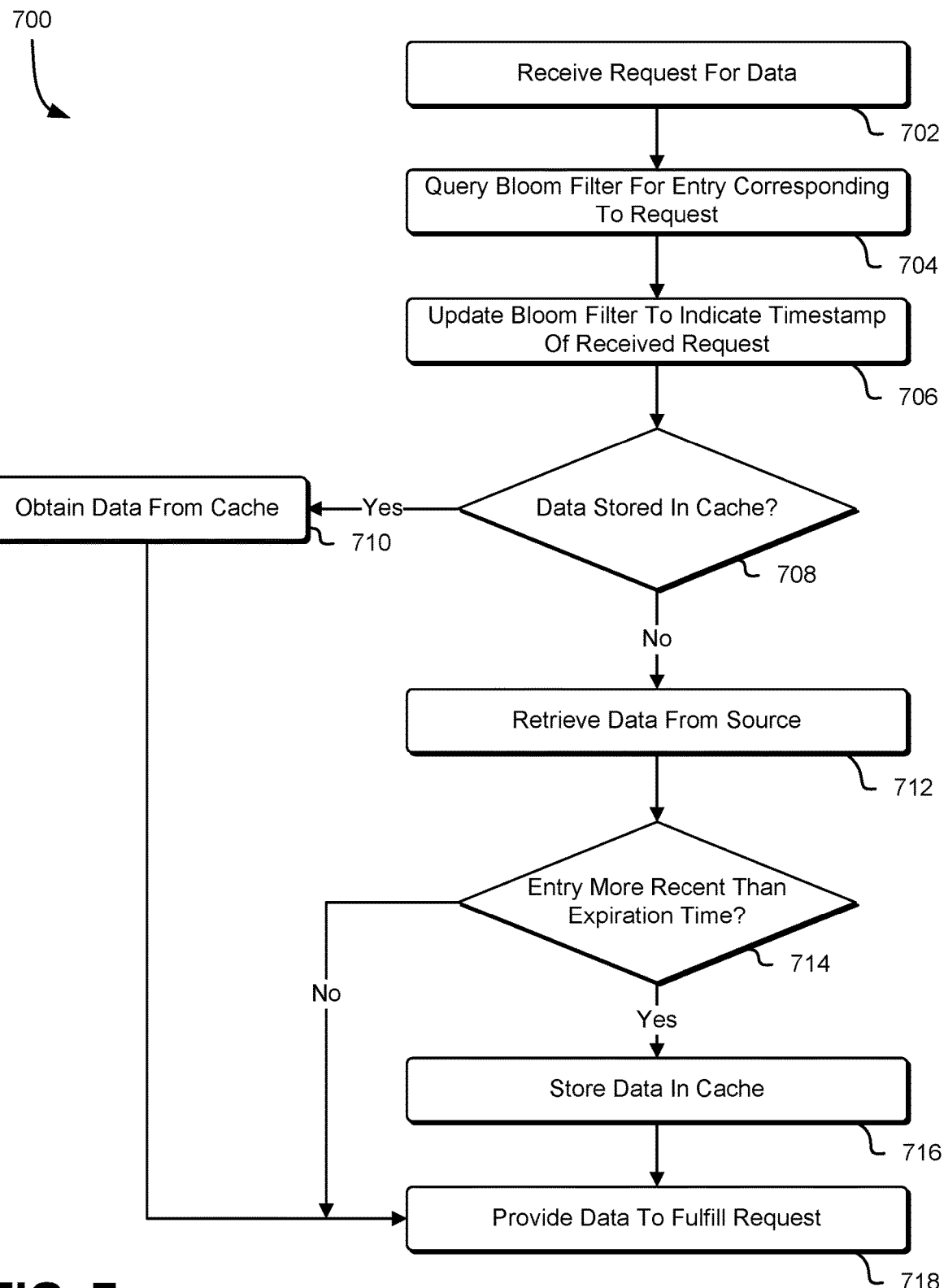
FIG. 7 shows an illustrative example of a process for utilizing a Bloom filter to determine whether to store data retrieved in response to a request in a cache based at least in part on an expiration of a timestamp for a previously received request in accordance with at least one embodiment.

As noted above, a CDN server receives a request from an end user to obtain data, such as web objects, downloadable objects, applications, streaming media (e.g., on-demand, live, etc.), and the like. The CDN server may utilize a Bloom filter to determine whether the requested data is stored in a cache. If the data is not stored in the cache, the CDN server may obtain the data from its source (e.g., the origin server, other content servers, etc.) and utilize information from the Bloom filter to determine whether to cache the data. Accordingly, FIG. 7 shows an illustrative example of a process for utilizing a Bloom filter to determine whether to store data retrieved in response to a request in a cache based at least in part on an expiration of a timestamp for a previously received request in accordance with at least one embodiment. The process 700 may be performed by the aforementioned CDN server or any other server or computing service that may obtain data from a variety of different sources and stores the data in a cache based at least in part on the frequency at which requests are received to retrieve the data.

At any time, the CDN server may receive 702 a request to obtain data. The request may specify a web address or other URI that may be used to identify the origin server comprising data to be retrieved from a particular web domain. In response to the request, the CDN server may utilize one or more elements of the request as input to an entry function that is used to obtain an output value. For instance, the CDN server may utilize the URI or web address as specified in the request as input into the entry function. Alternatively, the CDN server may utilize the domain name specified in the URI to determine a corresponding IP address that may be used as input into the entry function. The CDN server may utilize the output value obtained from the entry function as an entry that may be in the Bloom filter. Thus, the CDN server may query 704 the Bloom filter for the entry (e.g., output value of the entry function) corresponding to the received request.

In some embodiments, the CDN server determines that the entry corresponding to the request is present in the Bloom filter (e.g., the elements corresponding to the entry are set to a non-zero value). The CDN server may evaluate the elements corresponding to the entry in the Bloom filter to obtain a timestamp for the entry. This timestamp may denote a time at which a previous request for the data was received by the CDN server. As will be described in greater detail below, this timestamp may be used to determine whether the entry corresponding to the request has been observed more recently than an expiration time established by the CDN server, as defined by an administrator of the CDN. If the CDN server determines that the entry corresponding to the request is not present in the Bloom filter (e.g., the elements corresponding to the entry are set to zero), the CDN server may determine that the entry has not been previously observed.

In response to obtaining the timestamp from the Bloom filter, or determining that the entry corresponding to the request has not been previously observed, the CDN server may update 706 the Bloom filter to indicate a timestamp corresponding to a time at which the request for data was received. For instance, if the elements of the Bloom filter corresponding to the entry are set to a timestamp corresponding to a time at which a previous request to obtain the data was observed, the CDN server may update this timestamp specified in the elements of the Bloom filter to specify the timestamp corresponding to the current request. Alternatively, if the elements of the Bloom filter corresponding to the entry are set to a null value (e.g., zero), the CDN server may update these elements to specify the timestamp corresponding to the current request. Further, since the elements corresponding to the entry no longer specify a null value, the entry corresponding to the request may now be present in the Bloom filter.

In addition to updating the Bloom filter to indicate a timestamp corresponding to a time at which the present request was received, the CDN server may determine 708 whether the requested data is stored within a cache. For instance, the CDN server may query the cache for the requested data. If the requested data is stored in the cache, the CDN server may obtain 710 the data from the cache and provide 718 the requested data to the requestor to fulfill the request. However, if the CDN server is unable to locate the requested data within the cache, the CDN server may identify the storage location of the data within the CDN or the one or more origin servers. In response to identifying the storage location of the data, the CDN server may retrieve 712 the requested data from its source.

In an embodiment, if the CDN server retrieves the requested data from its source as a result of the requested data not being stored within the cache, the CDN server determines 714 whether the timestamp for the entry corresponding to the Bloom filter entry for the previous request is more recent than an expiration time established by the CDN server or administrator of the CDN. For instance, the CDN server may determine that data may be stored in a cache if it receives two requests within a particular period of time. The expiration time may denote a maximum time since receipt of a previous request to obtain the requested data. Thus, if the previous request to obtain the requested data was received at a time earlier than the expiration time, then requests to obtain the requested data do not satisfy a frequency threshold for enabling storage of the data within the cache. However, if the previous request to obtain the requested data was received at a time later than the expiration time, then the CDN server may determine that requests to obtain the requested data do satisfy the frequency threshold and, thus, the data may be stored in the cache to enable rapid access to the data.

If the timestamp corresponding to the entry in the Bloom filter is more recent than the expiration time, the CDN server may store 716 the data retrieved from its source in the cache. This may enable the CDN server to retrieve the data more rapidly in response to future requests to obtain the data, as the frequency at which requests are received to obtain the data may be significant (e.g., greater than a frequency threshold for requests). In addition to storing the data in the cache for more rapid access in response to future requests, the CDN server may provide 718 the retrieved data to the requestor to fulfill the request. However, if the timestamp corresponding to the entry in the Bloom filter is earlier than the expiration time for requests to obtain the data, the CDN server may forego storing the data in cache such that, in response to a future request to obtain the data, the CDN server may go to the source of the data to retrieve the requested data. The CDN server may thus, in response to the determination, provide 718 the data to the requestor to fulfill the request.

Figure 8:
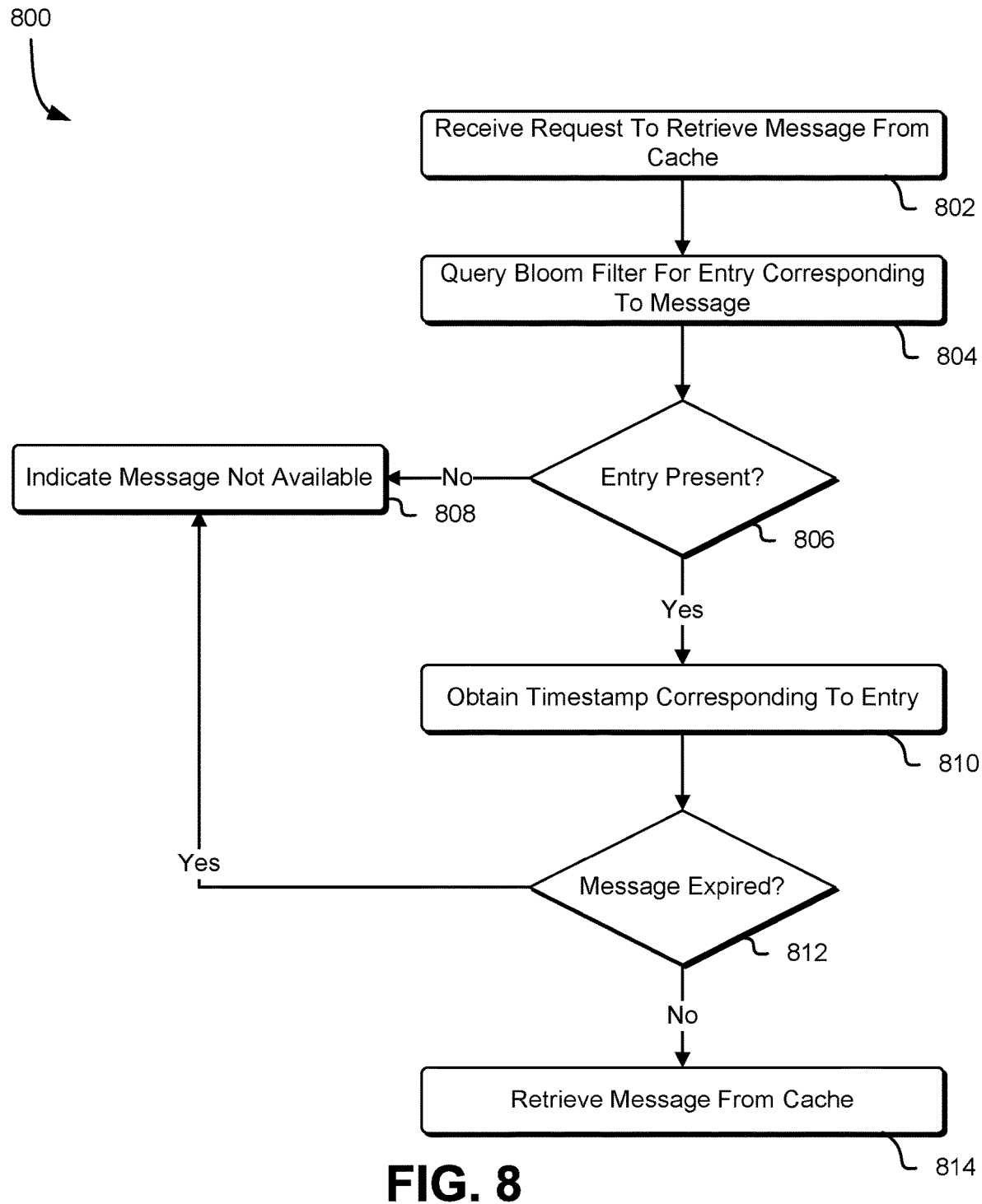
FIG. 8 shows an illustrative example of a process for utilizing a Bloom filter to determine whether a message is stored within a cache based at least in part on an expiration of the message in accordance with at least one embodiment.

At a later time, a user of a user client device may submit a request to retrieve a digital message from the cache. In response to the request, the computing resource service may determine whether an entry corresponding to the digital message is in the Bloom filter and, if so, obtain a timestamp corresponding to a time when the digital message was originally received. Based at least in part on this timestamp, the computing resource service may determine whether the digital message is available or has expired and been purged from the cache. Accordingly, FIG. 8 shows an illustrative example of a process 800 for utilizing a Bloom filter to determine whether a message is stored within a cache based at least in part on an expiration of the message in accordance with at least one embodiment. The process 800 may be performed by the aforementioned computing resource service, which may maintain a Bloom filter specifying timestamps corresponding to digital messages either stored within the cache or to digital messages that were previously stored in the cache and have since been purged due to their expiration.

A user of the computing resource service may transmit a query to the computing resource service to determine whether a particular digital message is available for the user's use. For instance, a user may want to determine what operations have been previously performed using the user's computing device. The query may specify an identifier corresponding to the digital message, the contents of the digital message, a portion of the contents of the digital message, or other information in a format that may be used by the computing resource service to identify the digital message being requested. Thus, the computing resource service may receive 802 a request to retrieve a digital message from the cache.

In response to the request, the computing resource service may query 804 the Bloom filter for an entry corresponding to the digital message. For instance, the computing resource service may use the information provided by the user as input into an entry function to obtain an output value. The computing resource service may hash this output value and utilize the hash output to identify the elements in the Bloom filter that correspond to the digital message being requested. The computing resource service may evaluate these elements to determine 806 whether the entry corresponding to the digital message is present within the Bloom filter. If the elements corresponding to the digital message being requested specify a null value, the computing resource service may determine that the entry is not present within the Bloom filter. This may cause the computing resource service to determine that the digital message has not been previously observed by the computing resource service. As a result, the computing resource service may indicate 808, to the user submitting the query, that the requested digital message is not available.

If the computing resource service determines that the entry corresponding to the digital message being requested is present within the Bloom filter (e.g., elements for the entry are set to a non-zero value), the computing resource service may obtain 810, from the Bloom filter, a timestamp corresponding to the entry. As described above, the timestamp may correspond to the time at which the digital message was originally received by the computing resource service and stored within the cache. The computing resource service may evaluate this timestamp in comparison with the present time to determine 812 the digital message has expired. For instance, the computing resource service may automatically purge any digital messages from the cache that have expired. As an illustrative example, the computing resource service may maintain a policy whereby digital messages stored in the cache over thirty days are expired and are purged from cache. Thus, if the timestamp corresponding to the digital message is older than expiration period for the digital message, the computing resource service may determine that the digital message has expired and has been purged from the cache. The computing resource service may transmit a notification to the user to indicate 808 that the digital message has expired and, as a result, is no longer available.

However, if the computing resource service determines, based at least in part on the timestamp obtained from the Bloom filter, that the digital message has not expired, the computing resource service may retrieve 814 the digital message from the cache. The computing resource service may provide the retrieved digital message to the user, thereby fulfilling its request. The computing resource service may maintain a copy of the digital message in the cache until the expiration period for the digital message has elapsed. In response to the expiration period of the digital message having elapsed, the computing resource service may purge the digital message from the cache.

Figure 9:
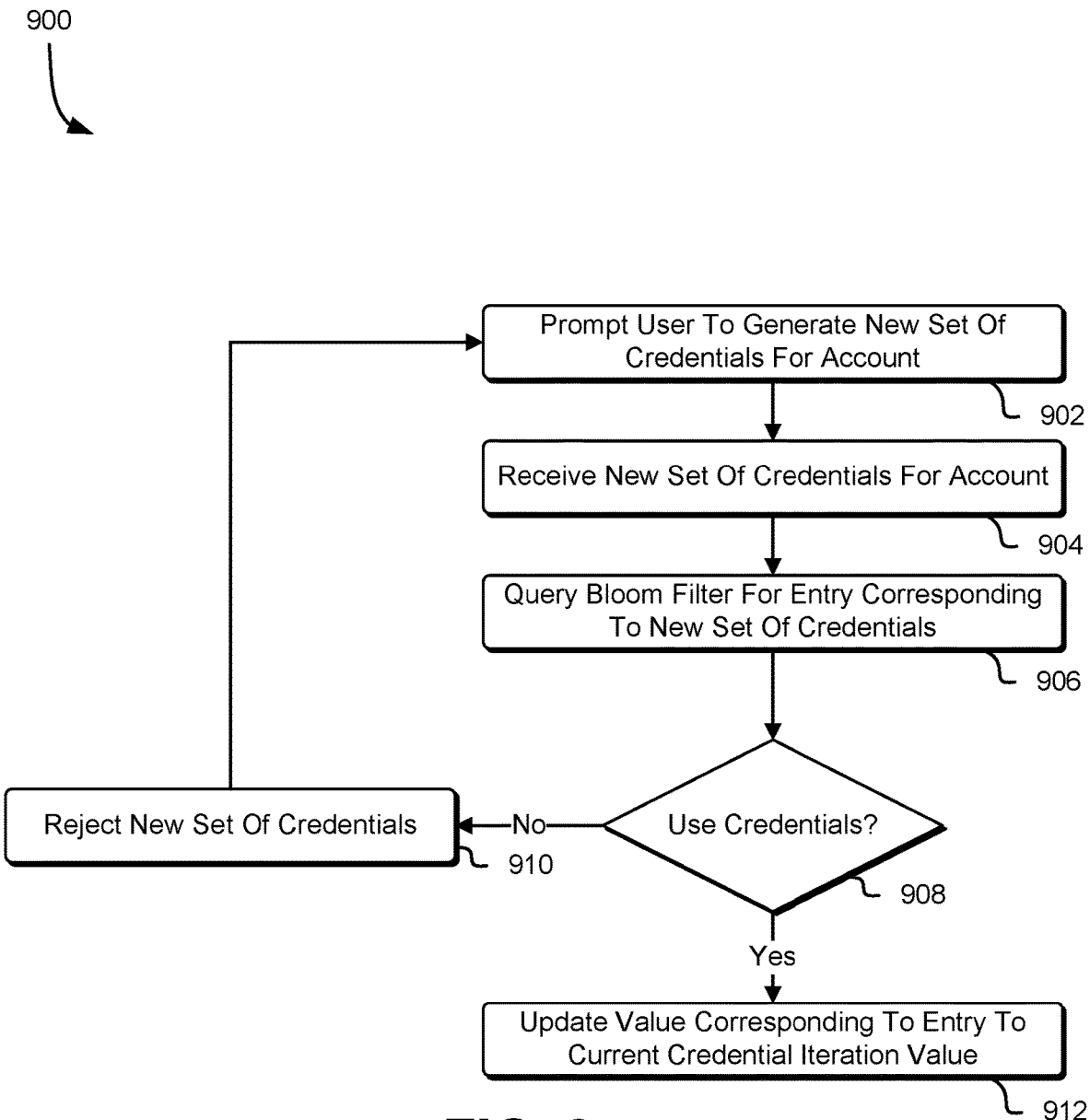
FIG. 9 shows an illustrative example of a process for utilizing a Bloom filter to determine whether a provided credential in response to a request to rotate a user's credential can be utilized in accordance with at least one embodiment.

As noted above, the computing resource service may utilize a Bloom filter to determine whether a credential provided by a user as part of a credential rotation scheme satisfies a requirement that the provided credential could not be part of a set of previously used credentials. If the provided credential is a part of this set of previously used credentials, the computing resource service may reject the new credential and prompt the user to provide an alternative credential that can be used to access the computing resource service. Accordingly, FIG. 9 shows an illustrative example of a process 900 for utilizing a Bloom filter to determine whether a provided credential in response to a request to rotate a user's credential can be utilized in accordance with at least one embodiment. The process 900 may be performed by the aforementioned computing resource service, which may perform a credential rotation scheme to enable users to rotate their credentials once users' previous set of credentials have expired.

The computing resource service may continually evaluate a user's existing set of credentials to determine whether the user is required to rotate their existing set of credentials by providing a new set of credentials. For instance, the computing resource service may maintain a database that specifies, for each user of the computing resource service, a time at which the user's current set of credentials are to expire. If the computing resource service determines that a user's set of credentials are about to expire, the computing resource service may prompt 902 the user to generate a new set of credentials for its account.

In response to the request, a user may generate a new set of credentials that it would like to implement in order to enable the user's continued access to the computing resource service. The user may provide the new set of credentials in addition to its current set of credentials to the computing resource service, which may receive 904 the new set of credentials for the account. In response to receiving the new set of credentials, the computing resource service may utilize the provided set of credentials as input into an entry function to obtain an output value. Using the output value, the computing resource service may query 906 the Bloom filter for the output value (e.g., entry) that corresponds to the new set of credentials provided by the user. For instance, the computing resource service may hash the output value to obtain a hash output that can be used to identify one or more elements of the Bloom filter. In some embodiments, the computing resource service further utilizes the user's current set of credentials as input into the entry function to obtain a second output value. Using this second output value, the computing resource service may query the Bloom filter for the output value that corresponds to the user's current set of credentials.

Based at least in part on the value specified in the Bloom filter elements corresponding to the provided new set of credentials and the value specified in the Bloom filter elements corresponding to the user's current set of credentials, the computing resource service may determine 908 whether to enable use of the provided new set of credentials. For instance, the value specified in the Bloom filter may denote an iteration value for the set of credentials being evaluated. As a new set of credentials is implemented, the computing resource service may utilize the value corresponding to the current set of credentials and increment this value by one to represent the value for the new set of credentials in the Bloom filter. In an embodiment, if the computing resource service determines that the entry corresponding to the provided new set of credentials is present in the Bloom filter, the computing resource service may obtain the credential iteration value for this new set of credentials and compare it to the value corresponding to the current set of credentials utilized by the user. If the difference between these values is less than a credential expiration value, the computing resource service may determine that the new set of credentials provided by the user is a member of a set of previously used credentials that cannot be utilized by the user. However, if the difference between these values is greater than the credential expiration value, the computing resource service may determine that the new set of credentials may be used, as the new set of credentials is not a member of the set of previously used credentials that cannot be utilized by the user.

If the computing resource service determines that the entry corresponding to the provided set of credentials is present within the Bloom filter and the difference between the credential iteration value for the provided set of credentials and the credential iteration value for the user's current set of credentials is less than the maximum credential iteration value, the computing resource service may determine that the new set of credentials are in a set of previously used credentials that may not be used. This may cause the computing resource service to reject 910 this new set of credentials. Further, the computing resource service may prompt 902 the user to generate a new set of credentials that may be used to access the computing resource service. If the user provides a new set of credentials to the computing resource service, the computing resource service may use the Bloom filter to determine whether this new set of credentials may be used.

However, if the difference between the credential iteration value for the provided set of credentials and the credential iteration value for the user's current set of credentials is greater than the maximum credential iteration value, the computing resource service may determine that the new set of credentials may be used. In response to this determination, the computing resource service may transmit a notification to the user indicating that it may use the provided set of credentials to access the computing resource service. Further, the computing resource service may update 912 the credential iteration value corresponding to the entry to specify the current credential iteration value. For instance, if the entry corresponding to the new set of credentials was not present in the Bloom filter (e.g., the elements corresponding to the entry specify a null value), the computing resource service may update the elements corresponding to the entry to change the null value to the current credential iteration value. Alternatively, if the entry is present in the Bloom filter, the computing resource service may replace the previous credential iteration value for the provided new set of credentials with the current credential iteration value.

Figure 10:
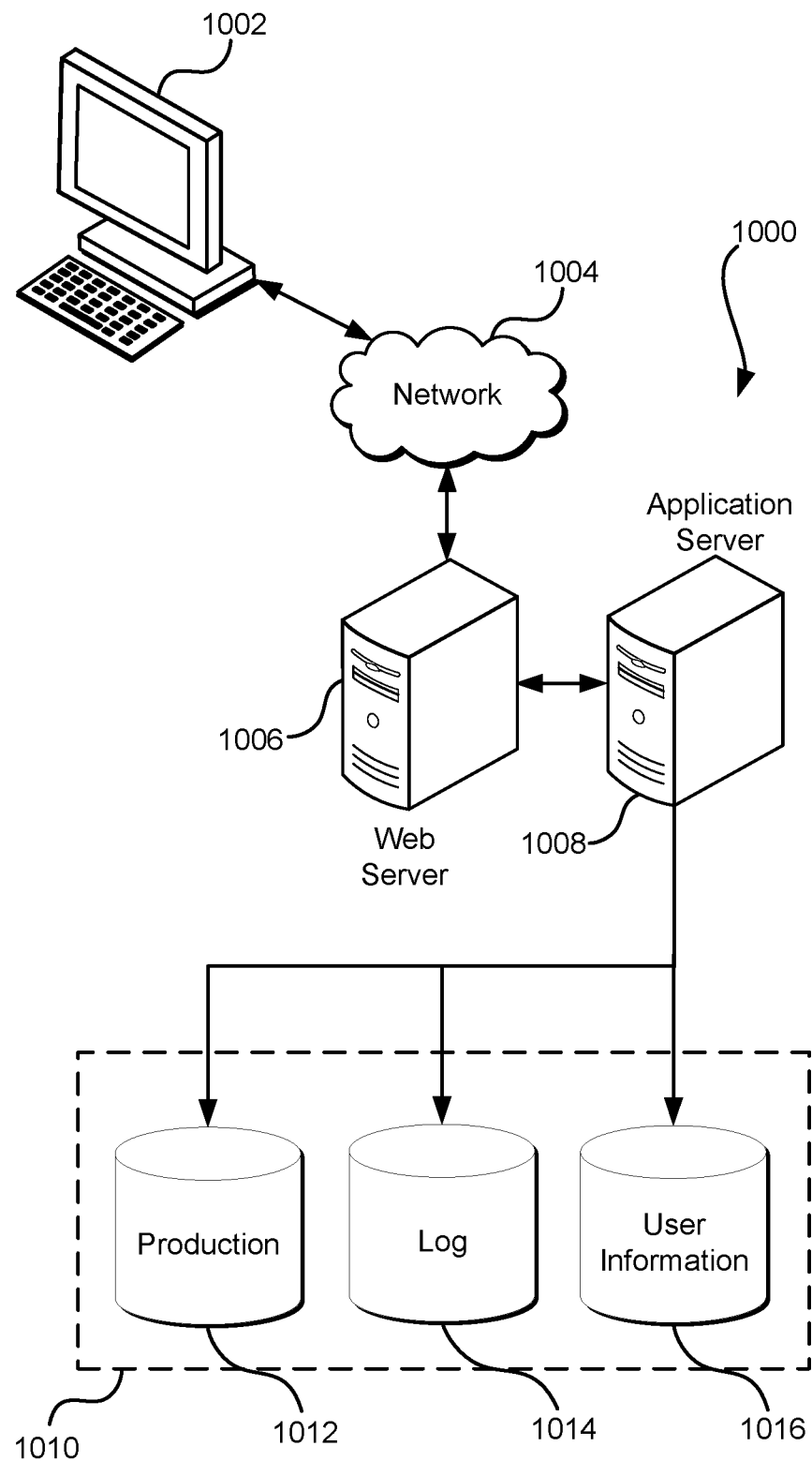
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("C S S"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a request to utilize a set of credentials associated with a user account, the request specifying an identifier that corresponds to the set of credentials;
    querying a probabilistic data structure to obtain, from the probabilistic data structure, a credential iteration value for an entry corresponding to the identifier, the credential iteration value corresponding to a time that the set of credentials was last used;
    generating, based at least in part on the credential iteration value obtained from the probabilistic data structure, a determination as to whether the set of credentials has expired; and
    providing a response to the request based at least in part on the determination such that:
        on a condition that the determination specifies that the set of credentials has expired, the response indicates that the set of credentials has expired; and
        on a condition that the determination specifies that the set of credentials has not expired, the response indicates that the set of credentials is valid.

2. The computer-implemented method of claim 1, wherein the method further comprises:
    obtaining the credential iteration value; and
    updating the credential iteration value within the probabilistic data structure.

3. The computer-implemented method of claim 1, wherein the method further comprises:
    obtaining a second credential iteration value for a second set of credentials;
    querying the probabilistic data structure to determine a second credential iteration value;
    determining, based at least in part on a difference between the credential iteration value and the second credential iteration value, that the second set of credentials may be used; and
    updating the credential iteration value, in the probabilistic data structure, for the second set of credentials to a new credential iteration value that is an incremental increase of the credential iteration value.

4. The computer-implemented method of claim 1, wherein:
    the probabilistic data structure is a Bloom filter; and
    querying the Bloom filter to determine the value for the entry corresponding to the set of credentials for the account includes:
        using the set of credentials as input into an entry function to obtain an output value;

hashing the output value to identify a set of elements within the Bloom filter, the set of elements specifying the credential iteration value; and evaluating the set of elements within the Bloom filter to obtain the credential iteration value.

5. A system, comprising:

one or more processors; and memory including instructions that, as a result of being executed by the one or more processors, cause the system to:

query a probabilistic data structure for an entry corresponding to a request, the entry corresponding to a set of credentials for an account;

obtain, from the probabilistic data structure, a value corresponding to the entry and to an expiration, the value further denoting a credential iteration value;

determine, based at least in part on the credential iteration value, whether the set of credentials exists in a previous set of credentials used in association with the account;

determine, based at least in part on the value corresponding to the entry, whether the expiration has occurred; and determine, based at least in part on whether the expiration has occurred, a manner of processing the request.

6. The system of claim 5, wherein the instructions further cause the system to:

utilize the entry corresponding to the request as an input to an entry function to obtain an output value;

hash the output value to identify a set of elements of the probabilistic data structure that correspond to the output value; and evaluate the set of elements of the probabilistic data structure to obtain the value.

7. The system of claim 5, wherein the instructions further cause the system to:

determine, in response to the query to the probabilistic data structure, that the entry corresponds to at least a first value and to at least a second value, the first value usable to determine that the entry has expired and the second value usable to determine that the entry has not expired; and select a lowest value of the first value and the second value to obtain the value corresponding to the entry.

8. The system of claim 5, wherein the probabilistic data structure is a Bloom filter comprising a set of elements whereby at least one or more elements of the set of elements are used to denote presence of the entry within the Bloom filter.

9. The system of claim 5, wherein the request is to obtain data and the entry corresponds to a previous request to obtain the data such that:

upon a determination, based at least in part on the value corresponding to the entry, that the previous request to obtain the data has expired, the data is provided to fulfill the request; and upon a determination, based at least in part on the value corresponding to the entry, that the previous request to obtain the data has not expired, the data is added to the probabilistic data structure and the data is provided to fulfill the request.

10. The system of claim 5, wherein:

the request is to access a computing resource service;

the entry corresponds to one or more credentials associated with a user computer device of the computing resource service;

the value corresponding to the entry denotes a timestamp corresponding to a time at which a previous request to access the computing resource service was received; and the instructions further cause the system to calculate, based at least in part on a time at which the request was received and the timestamp, an expiration period usable to determine whether the expiration has occurred.

11. The system of claim 5, wherein the instructions further cause the system to:

obtain a second request;

query the probabilistic data structure for an entry corresponding to the second request in the probabilistic data structure;

determine that the entry corresponding to the second request is not present in the probabilistic data structure;

fulfill the second request; and add a second value for the entry corresponding to the second request to the probabilistic data structure, the second value usable to determine whether an expiration has occurred for the entry corresponding to the second request.

12. The system of claim 5, wherein:

the instructions further cause the system to:

query the probabilistic data structure for a second entry corresponding to a second set of credentials for the account, the second set of credentials used to access the account;

obtain, from the probabilistic data structure, a second value corresponding to the second entry;

calculate a difference between the value and the second value; and determine whether the difference is greater than a credential expiration value, the credential expiration value usable to determine whether the set of credentials is a member of a set of credentials that cannot be implemented such that:

if the difference is greater than the credential expiration value, the request is fulfilled; and if the difference is less than the credential expiration value, the request is denied.

13. A non-transitory computer-readable storage medium storing thereon executable instructions that, as a result of being executed by one or more processors of a computer system, cause the computer system to at least:

obtain a request to utilize a set of credentials associated with a user account, the request associated with an entry that corresponds to the set of credentials;

utilize the entry as input into an entry function to obtain an output value that denotes an credential iteration value;

determine, based at least on the credential iteration value, that the set of credentials is not in a set of previously used credentials;

determine, based at least in part on the output value, a set of elements of a probabilistic data structure; and update the set of elements of the probabilistic data structure to specify a value that indicates a condition for expiration of the set of credentials.

14. The non-transitory computer-readable storage medium of claim 13, wherein:

the probabilistic data structure is a Bloom filter; and the instructions further cause the computer system to hash the output value to determine the set of elements of the Bloom filter that are to be updated.

15. The non-transitory computer-readable storage medium of claim 13, wherein the instructions further cause the computer system to:
- obtain a second request, the second request being the same as the request and received at a time later than the request;
- query the probabilistic data structure for the entry associated with the request;
- obtain, from the probabilistic data structure, the value;
- determine, based at least in part on the value, whether the entry associated with the request has expired; and
- determine, based at least in part on whether the entry associated with the request has expired, whether to fulfill the second request.

16. The non-transitory computer-readable storage medium of claim 15, wherein the instructions further cause the computer system to:
- determine, in response to the query, that the entry corresponds to at least a first value and to at least a second value;
- select a lowest value of the first value and of the second value; and
- use the lowest value to determine if the entry has expired.

17. The non-transitory computer-readable storage medium of claim 15, wherein:
- the second request is to retrieve data from a server and the entry corresponds to a previously obtained request to retrieve the data; and
- the instructions further cause the computer system to:
  - use the value associated with the entry to determine whether the previously obtained request to retrieve the data has expired; and
  - if the previously obtained request to retrieve the data has not expired, store the data in a cache and provide the data to fulfill the second request.

18. The non-transitory computer-readable storage medium of claim 15, wherein:
- the instructions further cause the computer system to:
  - query the probabilistic data structure for a second entry corresponding to an active set of credentials for the account;
  - obtain, from the probabilistic data structure, a second iteration value corresponding to the second entry;
  - calculate a difference between the second iteration value and the iteration value; and
  - determine whether the difference is greater than a credential expiration value, the credential expiration value usable to determine whether the set of credentials is a member of the set of previously used credentials that cannot be associated with the account such that:
    - upon a determination that the difference is greater than the credential expiration value, the second request is fulfilled; and
    - upon a determination that the difference is less than the credential expiration value, the second request is denied.

19. The non-transitory computer-readable storage medium of claim 15, wherein:
- the second request is to access a computing resource service;
- the entry corresponds to a set of credentials associated with a user computer device;
- the value corresponding to the entry denotes a timestamp corresponding to a time at which a previous request to access the computing resource service was received;
- the instructions further cause the computer system to:
  - calculate, based at least in part on a time at which the request was received and the timestamp, an expiration period; and
  - determine, based at least in part on the expiration period, if the entry has expired.

20. The non-transitory computer-readable storage medium of claim 13, wherein the instructions further cause the computer system to:
- query the probabilistic data structure for the entry;
- determine that the entry is not present in the probabilistic data structure;
- fulfill the request; and
- change the set of elements of the probabilistic data structure from a null value to the value to update the set of elements.

* * * * *